United States Patent [19]

Dockter et al.

[11] Patent Number: 5,420,801
[45] Date of Patent: May 30, 1995

[54] SYSTEM AND METHOD FOR SYNCHRONIZATION OF MULTIMEDIA STREAMS

[75] Inventors: Michael J. Dockter, Hollister; Charles L. Haug, Santa Cruz, both of Calif.; Kevin D. Seppi, Austin, Tex.

[73] Assignee: International Business Machines Corporation, Armonk, N.Y.

[21] Appl. No.: 976,159

[22] Filed: Nov. 13, 1992

[51] Int. Cl.⁶ .......................... G06F 9/00; G06F 13/00
[52] U.S. Cl. ................................................. 364/514 R
[58] Field of Search ............... 364/514, 468, 131, 419, 364/133, DIG. 1, 271.2, 271.3, 271.4, DIG. 2, 945.9; 434/185; 340/825.14, 825.2, 714, 721; 358/140, 142, 185, 182; 360/14.3; 395/152, 154, 650, 250; 377/20, 110; 81/603; 84/DIG. 12

[56] References Cited

U.S. PATENT DOCUMENTS

| | | | |
|---|---|---|---|
| 3,631,452 | 12/1971 | Richard | 364/419 |
| 3,761,884 | 9/1973 | Avsan et al. | 364/DIG. 1 |
| 3,787,617 | 1/1974 | Fiori | 360/14.3 |
| 3,867,615 | 2/1975 | Sioufi | 377/20 |
| 3,932,847 | 1/1976 | Smith | 364/DIG. 1 |
| 4,067,049 | 1/1978 | Kelly et al. | 360/14.3 |
| 4,369,494 | 1/1983 | Bienvenu et al. | 364/DIG. 1 |
| 4,412,471 | 11/1983 | Stier met al. | 84/DIG. 1 |
| 4,507,691 | 3/1985 | Ishiguro et al. | 360/14.3 |
| 4,531,052 | 7/1985 | Moore | 364/514 |
| 4,821,101 | 4/1989 | Short et al. | 358/181 |
| 4,855,730 | 8/1989 | Venners et al. | 340/825.24 |
| 4,858,033 | 8/1989 | Chippendale | 360/14.2 |
| 4,884,972 | 12/1989 | Gasper | 395/132 |
| 4,937,780 | 6/1990 | Geyer et al. | 364/900 |
| 4,945,486 | 7/1990 | Nitschke et al. | 364/133 |
| 4,956,784 | 9/1990 | Hadovi et al. | 364/468 |
| 4,969,092 | 11/1990 | Shorter | 364/DIG. 1 |
| 4,989,133 | 1/1991 | May et al. | 364/DIG. 1 |
| 4,994,912 | 2/1991 | Lamelsky et al. | 358/140 |
| 5,007,005 | 3/1991 | Hatakeyama | 395/152 |
| 5,065,345 | 11/1991 | Knowles et al. | 395/154 |
| 5,101,340 | 3/1992 | Nonaka et al. | 395/650 |
| 5,111,409 | 5/1992 | Gasper et al. | 395/152 |
| 5,119,474 | 6/1992 | Beitel et al. | 395/154 |
| 5,129,036 | 7/1992 | Doan et al. | 358/144 |
| 5,185,665 | 2/1993 | Okura et al. | 358/185 |
| 5,239,641 | 8/1993 | Horst | 364/DIG. 1 |
| 5,286,908 | 2/1994 | Jungleib | 81/603 |
| 5,291,468 | 3/1994 | Carmon et al. | 395/250 |

FOREIGN PATENT DOCUMENTS 3214487  1/1990  Japan ......................... G11B 27/024

OTHER PUBLICATIONS

Mercer et al; "Preemplibility in Real-time Operating System"; IEEE 1992.
Ralston et al; "Encyclopedia of Computer Science" Petrocelli/Chartor 1976.
Little et al; "Multimedia object models for synchronization and Data Bases"; IEEE 1990.
Hodges et al; "A Construction Set for Multimedia Applications"; IEEE 1989.

Primary Examiner—Ellis B. Ramirez
Attorney, Agent, or Firm—Prentiss Wayne Johnson; David J. Kappos

[57] ABSTRACT

A computer-based multimedia presentation system is provided with a synchronization scheme for recording and playing independent media. The disclosed system and method allows media processes and single medium processes to achieve and maintain synchronization with each other without process interdependence and without interprocess communication. This capability is provided by assigning a common clock for all processes, requiring all participating media processes to reference the common clock, informing each process of, a synchronization basepoint called a "zero-time", and then allowing each process to independently synchronize itself to the common clock. The common clock itself does not provide any stimulus to a media process; it is a passive component in the synchronization. The media process is the active component, referring to the common clock as required to maintain synchronization for the particular media it is handling.

34 Claims, 8 Drawing Sheets

SYSTEM AND METHOD FOR SYNCHRONIZATION OF MULTIMEDIA STREAMS

FIELD OF THE INVENTION

This invention relates in general to multiprocessing computer systems and in particular to synchronization of multiple independent processes in such computer systems.

BACKGROUND OF THE INVENTION

The dramatic advances being made in computer processing speed and storage capacity have created new opportunities for computer applications. One of these opportunities lies in the area of multimedia presentations, which combine computerized audio, still pictures, video, text, and other media to create dynamic, sensory-rich communication with computer users.

One of the important challenges involved in presenting multimedia information in a cohesive, life-like fashion is synchronization of the numerous components that make up a typical presentation. This synchronization includes two aspects: first, the presentation components must start in synchrony; second, they must progress at the same rate. Moreover, both aspects of synchronization must be adhered to even when the presentation is played after fast-forward or reverse, or is started at a point other than its beginning.

Because the modern computer systems used to play multimedia presentations frequently run multiple tasks, programs, and processes concurrently, and use multiple processors simultaneously, synchronization of processes can become a significant problem. Thus, the audio portion of a presentation, which comprises one process, may proceed faster than the video portion, which comprises a second process, for reasons which cannot be known prior to playing the presentation. For example, if a multimedia presentation which plays the audio and video of a human speaker is interrupted by an extraneous concurrent process, the audio and video can become unsynchronized, resulting in the perception by the observer that the speaker's lip movements and words do not match. Such effects can significantly detract from the overall quality of the presentation.

Various techniques have been devised for dealing with the synchronization problems that arise in multimedia presentation systems. There are three methods which have been user to solve the synchronization problem. The first of these is a barrier method, that is, each media is allowed to proceed at its own pace until a barrier time or "sync-point" is encountered. Each media waits at the sync-point until all other media have arrived. Once all media have reached the sync-point the media are again allowed to proceed at there own pace.

A second approach uses messages or "pulses" to indicate to the component media, the current position, time, or offset in the multimedia presentation. A master process is sends out these pulses at some rate. Each medium is responsible for making adjustment to its rate to try to match the current or anticipated position (time) of the master.

The third approach is to use a common clock which is adjustable by a master process (or processes). Although such methods have been openly discussed, we are unaware of any complete algorithm which includes methods For initiating, and re-initiating, the synchronization and allows for "re-winding" and "fast-forwarding" in the presentation.

While these various approaches all tend to improve the synchronization of multimedia presentations vis-a-vis a Free-running paradigm, they are not without serious drawbacks. For example, the sync-pointing approaches can be dependent on the processor speed or the hardware. This may allow a presentation to work well in some cases but fail to synchronize in other cases or on different hardware. The pulsing approaches require the pulses to be sent out a sufficient rate to allow For synchronization (this rate may vary on the presentation) video For example may require significant pulse, requiring significant system resources. Pulsing also requires that processes quickly identify the reception or a pulse. Unfortunately, pulse may arrive at times which are inconvenient For the receiving process. Other common-clock approaches may not have clear startup or re-start methods. All of the methods described above have some sort of master process, the rate of that process is assumed to be correct. However, even a master process running at a high priority will experience some variance in its rate. This variance make the task of the slave processes even more difficult, not only do they have to adjust for there own variance, they must also adjust to the variance in the master process's execution rate. The master process also becomes a single point of failure. The methods described above all rely on a clock with encoded clock values. These clock values are typically stored in fixed length fields. With out some care, these clock values may be subject to wrapping, just as a regular clock wraps from 12:00 back to 1:00. Also, the methods described above, may not be applicable to the recording of a synchronized presentation.

Thus, there has heretofore existed an unmet need for a system and method of synchronizing multiple processes in a multimedia presentation without the use of an active clock or a resident controlling process.

SUMMARY OF THE INVENTION

In accordance with the invention, a computer-based multimedia presentation system is provided with a synchronization scheme for recording and playing independent media. The disclosed system and method allows media processes and single medium processes to achieve and maintain synchronization with each other without process interdependence and Without interprocess communication. This capability is provided by assigning a common clock for all processes, requiring all participating media processes to reference the common clock, informing each process of a synchronization basepoint called a "zero-time", and then allowing each process to independently synchronize itself to the common clock.

The common clock is used by all media processes in the computer system to control the rate at which the media is presented. The common clock is made accessible to all processes so that all can maintain synchronization. It is referenced as needed by the various processes participating in a particular presentation and its value is used to determine when to present the next media event. A media event can be broadly viewed as that which stimulates human perception. The duration of a media event is determined by the individual media processes.

The coded zero-time given to each media process consists of a field the same size as the common clock's field. The zero-time field contains a binary pattern which is to be logically added to the common clock.

The result of the addition yields another time scale called the zero-time scale. When the common clock advances to zero-time the resulting zero-time scale value equals zero, because of the wrapping of the logical addition, the multimedia presentation begins. In this way, the system is protected against improper operation caused by wrapping of the common clock.

The value of the common clock in conjunction with the coded zero-time is the basis by which a media process determines when to present the next media event. The common clock itself does not provide any stimulus to a media process; it is a passive component in the synchronization. The media process is the active component. As the common clock value increases, so does the value on the zero-time scale. The zero-time scale represents the time elapsed since the start of the presentation. A media process determines when to present the next media event by comparing the time the event needs to be presented with the current zero-time scale value. The process then waits until the time of the next event equals the value on the zero-time scale and at that time presents the event.

Additional aspects of the invention include algorithms for starting, re-starting, rewinding, fast-forwarding, and recording presentations.

Numerous advantageous effects flow from the zero-time synchronization technique of the present invention. First, media processes are able to work in concert with one another without the necessity for intercommunication. By synchronizing itself to the common clock, each process is automatically synchronized with all other processes which themselves are synchronized with the common clock. Since each process has independent control of synchronization; each process can determine its own optimum times for checking synchronization. Second, because the coded zero-time establishes a point in time which each process must use as time zero (i.e. 00:00:00), a process can be started either before or after time zero and is still able to synchronize with the other media processes. Moreover, processes can re-synchronize themselves by performing a resynchronization action such as sleeping, compressing, truncating, deleting, or elongating because they can determine tile synchronization discrepancy by comparing the time within tile presentation to the time on the zero-time scale. Sleeping involves waiting for the next-event time. Compressing is accomplished by performing the media at a higher rate than originally recorded. Truncating and deleting are methods of not performing certain parts of a multimedia presentation. Elongating is accomplished by performing the media at a lower rate than originally recorded. Third, because only the common clock is required for synchronization, processes do not need operating system support for synchronization or for interprocess communication generally. Fourth, since the coded zero-time augments the information in the common clock for each presentation, a single clock can be used for multiple concurrent presentations. Finally, because the coded information allows the common clock to appear as time zero, the entire range of the clock can be used before the clock wraps to its initial value. Thus, long presentations can be created without concern for the timing confusion caused by clock wrapping.

DETAILED DESCRIPTION OF THE INVENTION

Figure 1:
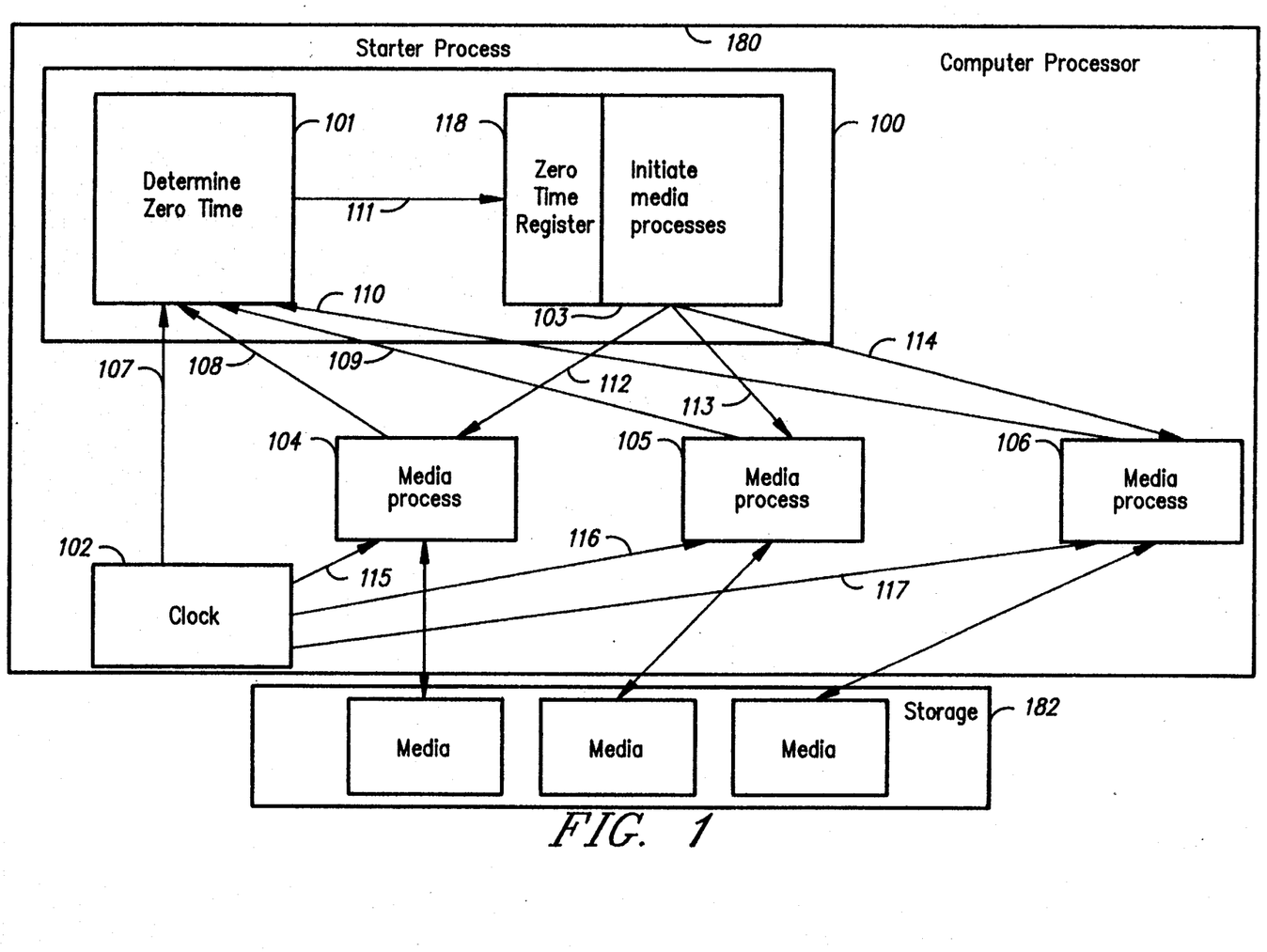
FIG. 1 is a block diagram illustrating the major processes contributing to the synchronization or multimedia presentations in accordance with the present invention.

Shown if FIG. 1 is a high level representation or the system components and information flow which provide multimedia synchronization in accordance with the present invention. The major components include: starter process 100 which performs the functions of determining zero-time at 101 and initiating the media processes at 103, media processes 104 105 106, also known as media operations, which record and/or playback a synchronized multimedia presentation, and clock means 102 which provides the current time in the computer system. The current time is the interpretation of the temporal bit pattern into standard time nomenclature hours, minutes, seconds, milliseconds, etc.

The system executes on computer processor 180, recording and playing media to/from computer storage 182. Processor 180 may be a microprocessor or any other instruction-executing computer processor means. Computer storage 182 may be RAM memory, disk memory, optical, tape, bubble, or any other form of electronically accessible data storage. Normally, currently accessed information including media is stored in RAM where it is readily available to processor 180. Other data, such as media not currently being presented or recorded is stored on disk or tape where it is still accessible albeit at a lower rate.

In operation, starter process 100, executing on computer processor 180, first determines zero-time at 101 by gathering estimated initialization times 108, 109, and 110 from participating media processes 104, 105, and 106. This can be accomplished by a variety of techniques, including querying each process for an estimated initialization time or encapsulating the estimated initialization times within starter process 100. The estimated initialization time for the media processes is then calculated. Next, clock 102 is used to obtain a reference to the current time via 107, this is also known as the initialization-time value. By adding together the current time with the estimated initialization time for the media processes, known as a process preparation time, starter process 100 determines a zero-time value and constructs the coded zero-time. The determined zero-time, now in the form of coded zero-time 111, is then used to initiate the media processes at 103. This involves dispatching each of media processes 104, 105, and 106, while passing to them coded zero-time via 112, 113, and 114. Each of the media processes 104, 105, and 106, acts as a receiving process in that they receive the coded zero-time 111. This completes communication required to create synchronization. Given this single receipt of zero-time, each media process can proceed to perform its function without further input from starter process 100. To achieve and maintain synchronization, each of media processes 104, 105, and 106 uses the zero-time information in conjunction with repeated references to the current time from clock 102 via 115, 116, and 117.

Figure 2:
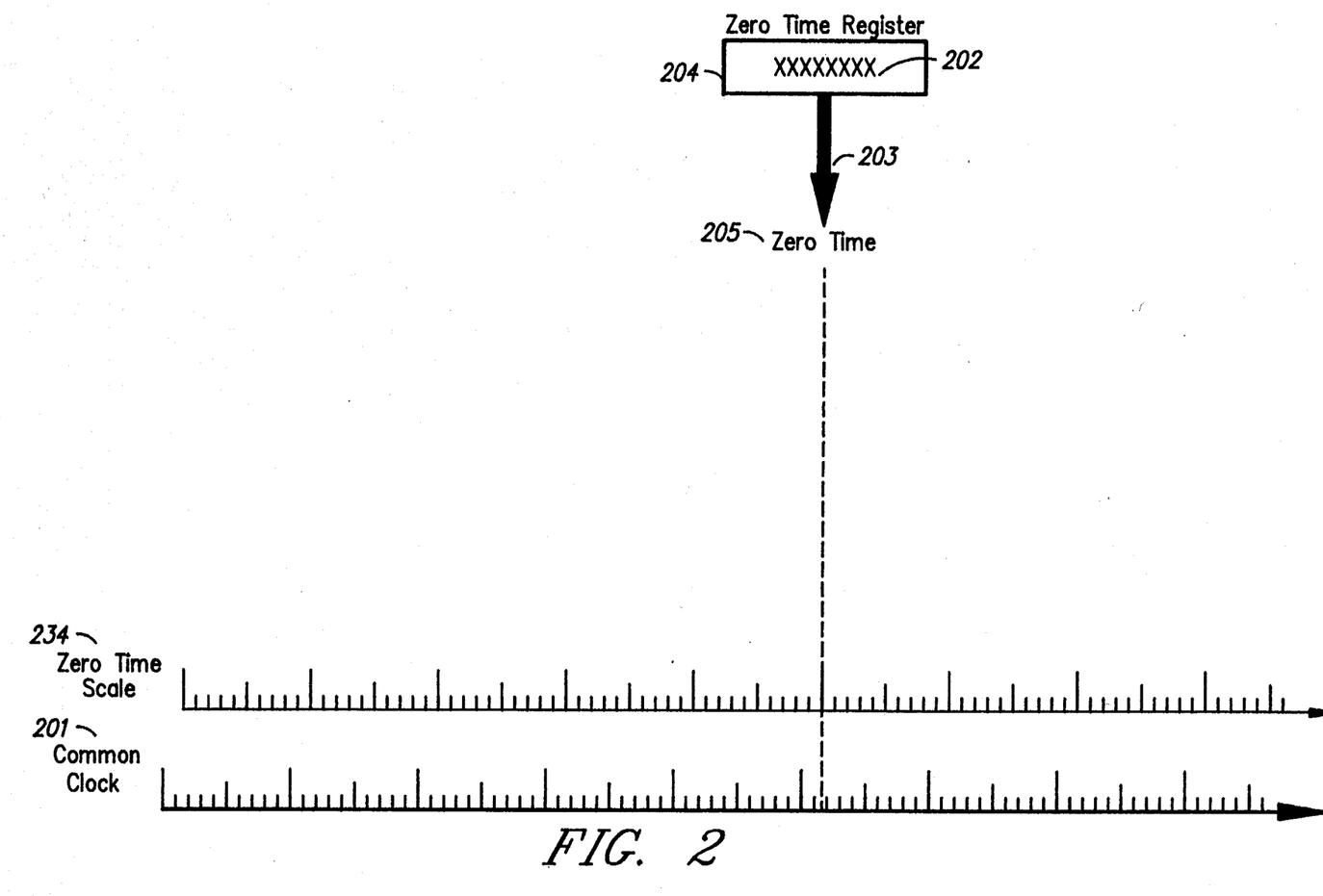
FIG. 2 is a timeline illustrating the components used to develop zero-time.

The basic components necessary for synchronizing multimedia processes in accordance with the present invention are shown in FIG. 2. Included are common clock 201, zero-time register 204, zero-time broadcast means 203, and the zero-time scale 234. The common clock 201 is accessible to all participating processes. It advances at a predictable rate, and has a frequency suitable multimedia presentations. If a clock having a period (i.e. the clock can "wrap") is chosen for common clock 201, that period must be longer than the multimedia presentation in order to avoid the apparent anomaly that occurs when the time progression experiences a step function from a high value to a low value. In the preferred embodiment, the standard system clock of an IBM PS/2 personal computer is used to generate the common clock. This clock has a period of over 49 days, which is of ample length in comparison with virtually all multimedia presentations.

Zero-time register 204 is loaded with data, determined in a manner that will be described in detail below, identifying a time at which the multimedia presentation is to begin. This point in time will be referred to as zero-time 205. Zero-time broadcast means 203 is loaded with a value, determined in a manner that will be described in detail below, identifying which is broadcast to the various participating media processes and from which each process can determine zero-time 205 and the zero-time scale 234. This data will be referred to as coded zero-time 202.

Recording Multimedia

Figure 3:
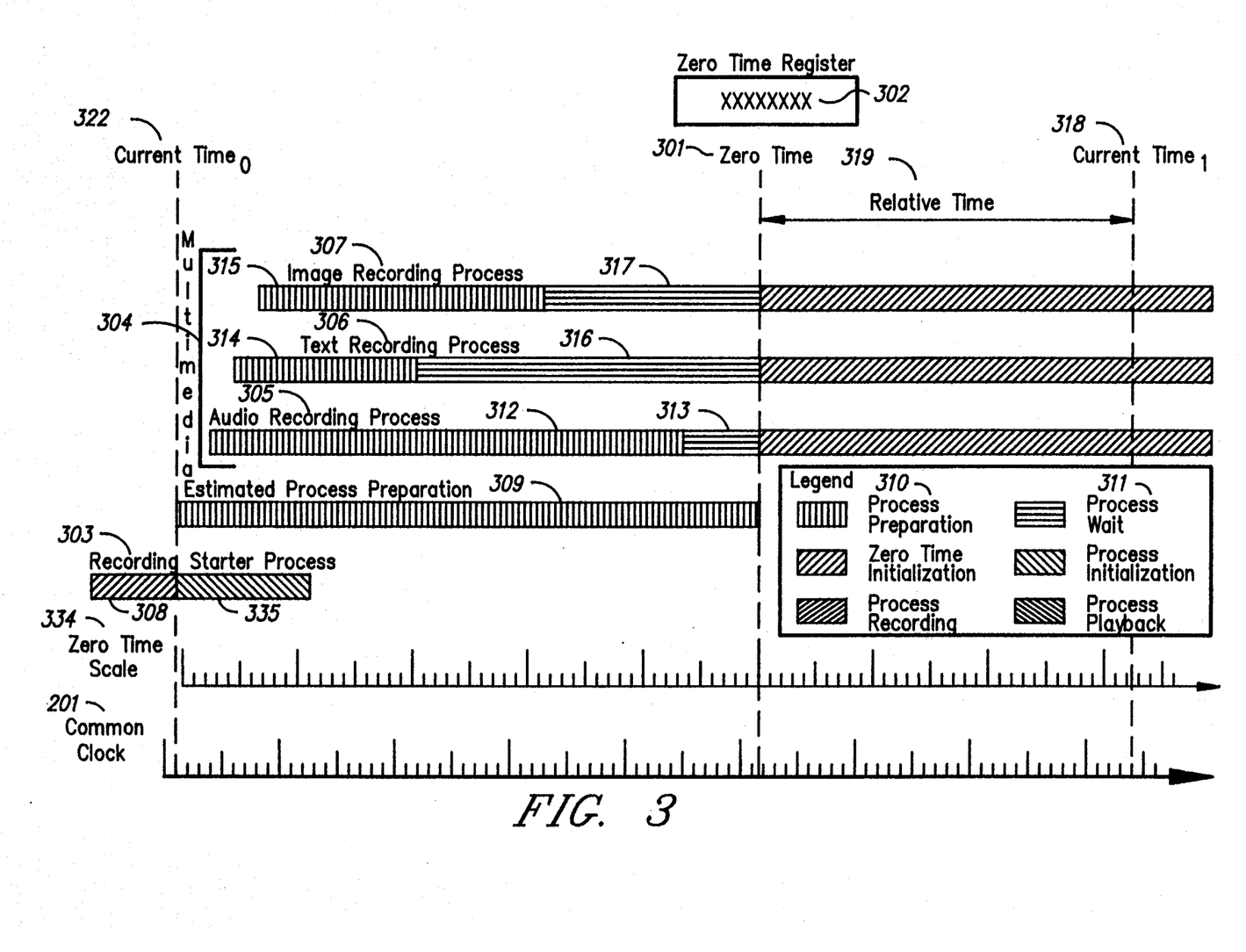
FIG. 3 is a timeline illustrating the synchronized recording of multi-media.

Shown in FIG. 3 is a multimedia recording system in accordance with the present invention. Two major components are included in the system. The first is a process which establishes zero-time 301 and creates the coded zero-time 302. This process is called the recording starter process, and is designated as 303. From the coded zero-time 302 and the common clock 201 a zero-time scale 334 can be constructed by any process. The second component is one or more processes which will use coded zero-time 302 in conjunction with common clock 201 in recording multimedia or single media events. These processes are called media recording processes and are designated as 304. Examples of multimedia recording processes 304 are audio recording process 305, text recording process 306, and image recording process 307.

During operation of the system, common clock 201 advances continuously. Recording starter process 303 is started to establish zero-time 301 during zero-time initialization 308 and initiate all or media recording processes 304 during process initiation 335. Recording starter process 303 calculates zero-time 301 based upon the current time 322 on common clock 201 and the estimated process preparation 309 needed by media recording processes 304. Recording starter process 303 constructs coded zero-time 302 and initiates audio recording process 305, text recording process 306, and image recording process 307, passing in coded zero-time 302 to each of media recording processes 304 Alternatively, recording starter process 303 may keep coded zero-time 302 available For query by any of media recording processes 304. After all media recording processes 304 have been initiated, recording starter process 303 can either cease, become a member of media recording processes 304, or perform other tasks.

Each of media recording processes 304 will perform process preparation, designated as 310, in order to prepare internal resources and acquire external resources. If zero-time 301 has not passed when one of media recording processes 304 has finished process preparation 310, that process will perform a process wait, designated as 311, until zero-time 301 occurs. This time is known as media start-time or more generically a first event start-time. Each of media recording processes 304 will operate independently of the other media recording processes. This is possible because each of media recording processes 304 knows of common clock 201 and possesses coded zero-time 302.

Once audio recording process 305 has been initiated, it begins audio recording process preparation, designated as 312. Audio recording process 305 will acquire control of the audio recording hardware, allocate filename(s), prepare a place to put the digitized data, and initialize internal control mechanisms. If zero-time 301 has not passed by the time audio recording process preparation 312 is finished, audio recording process 305 will calculate the amount of time it must perform audio recording process wait, designated as 313, in order to begin the multimedia at zero-time 301. The recorded data from the audio recording process 305 contains information indicating that recording started at zero-time 301. If zero-time 301 has passed by the time audio recording process preparation 312 is finished, the recorded data from audio recording process 305 contains the knowledge that recording started after zero-time 301 by the difference in time between zero-time 301 and the end audio recording process preparation 312. In all cases the ACTUAL offset, not the intended offset from zero time is recorded for the event. This offset, the offset time, is used during play-back to synchronize the media just as they were observed during recording.

Once text recording process 306 has been initiated, it begins text recording process preparation, designated as 314. Likewise, image recording process 307 will begin image recording process preparation, designated as 315, at this time. As with audio recording process preparation 312, each process must allocate its own internal and external resources. Text recording process 306 must then determine whether to enter text recording process wait, designated as 316; likewise, image recording process 307 must determine whether to enter image recording process wait, designated as 317. Each of media recording processes 304 keeps track of whether it started at zero-time 301 or how long after zero-time 301 it started.

As audio recording process 305, text recording process 306, and image recording process 307 are recording, they periodically check the difference between zero-time 301 and current time 318. This difference, denoted as relative time 319, is used to adjust the rate of recording, to log the time of an event, known as an event offset, or to determine the duration of an event. An alternative to logging the time of certain media events is keeping a constant rate at which the media events are recorded. From the rate, information similar to a log can be constructed.

Playing Multimedia

Figure 4:
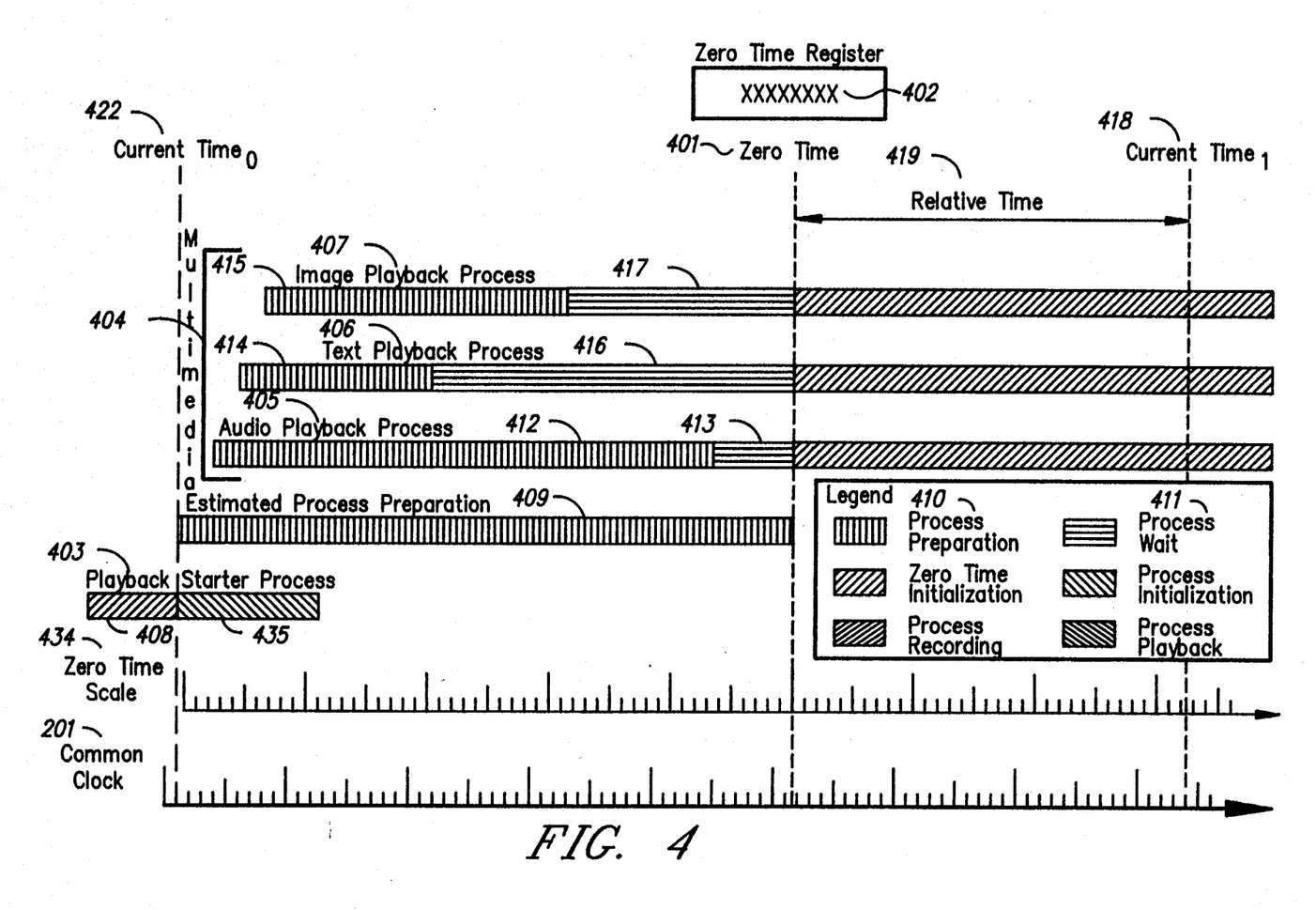
FIG. 4 is a timeline illustrating the synchronized playback of multi-media.

Shown in FIG. 4 is a multimedia playing system in accordance with the present invention. Two major components are included in the system. The first is a process which establishes zero-time 401 and creates coded zero-time 402. This process is called the playback starter process, and is designated as 403. From the coded zero-time 302 and the common clock 201 a zero-time scale 434 can be constructed by any process. The second component is one or more processes which use coded zero-time 402 in conjunction with common clock 201 to play multimedia or single media events. These processes are called media playback processes and are designated as 404. Examples of media playback processes 404 are audio playback process 405, text playback process 406, and image playback process 407.

As common clock 201 is advancing, playback starter process 403 is started to establish zero-time 401 during zero-time initialization 408, and initiate media playback processes 404 during process initiation 435. Playback starter process 403 calculates zero-time 401 based upon the current time 422 on common clock 201 and the estimated process preparation 409 needed by media playback processes 404. Playback starter process 403 constructs coded zero-time 402 and initiates audio playback process 405, text playback process 406, and image playback process 407, passing in coded zero-time 402 to each of media playback processes 404. Alternatively, playback starter process 403 may retain coded zero-time 402 available for query by any of media playback processes 404. After media playback processes 404 have been initiated, playback starter process 403 can either cease, become a member of media playback processes 404, or perform other tasks.

Each of media playback processes 404 will perform a process preparation 410 in order to prepare all of its internal resources and acquire all of its external resources. If zero-time 401 has not passed when one of media playback processes 404 has completed process preparation 410, that media playback process will perform a process wait 411 until zero-time 401 occurs. This time is known as media start-time. Each or media playback processes 404 will operate independently or the other media playback processes. This is possible because each of media playback processes 404 is aware of common clock 201 and is provided with coded zero-time 402.

Once audio playback process 405 has been initiated, it begins audio playback process preparation 412. Audio playback process 405 acquires control or the audio playback hardware, locates the audio data file(s) (including a log file in which the zero-time offsets are given for all audio events, such as, when to start the audio, and when to switch audio data files), prepares storage space for the digitized data, and initializes the audio playback hardware, any data buffers required for audio playback, as well as locating the common clock, determining the first audio event anti and other general initialization If zero-time 401 has not passed by the time audio playback process preparation 412 is finished, audio playback process 405 determines the amount of time it must perform audio playback process wait 413 in order to begin the multimedia presentation at zero-time 401. If zero-time 401 has passed by the time audio playback process preparation 412 is finished, audio playback process 405 advances into the recorded audio data to account for the difference in time between zero-time 401 and the end of audio playback process preparation 412. If the audio data contains information indicating that the original recording began after zero-time, audio playback process 405 continues its audio playback process wait 413 until that amount of time after zero-time 401.

Once text playback process 406 has been initiated, it begins text playback process preparation 414. Likewise, image playback process 407 begins image playback process preparation 415. As with audio playback process preparation 412, each process must allocate its internal anti external resources. Text playback process 406 then determines whether to enter text playback process wait 416 until zero-time 401, whether to enter it until after zero-time 401, or whether to advance through the text data. Image playback process 407 determines whether to enter image playback process wait 417 until zero-time 401, whether to enter it until after zero-time 401, or whether to advance through the image data.

As audio playback process 405, text playback process 406, and image playback process 407 are playing, they periodically check the difference between zero-time 401 and current time 418. This difference, relative time 419, is used to adjust the rate of playing, and to detect the need to skip forward or wait for the next event in the case where synchronization is lost. In cases where an unforeseen system load has caused the process to fall out of synchronization, the process must adjust the rate at which is plays to get back into sync. The process may choose to skip ahead if it has fallen behind in the presentation, or it may choose to wait if it has gotten ahead. Both skipping and waiting may be implemented using a variety of techniques known in the art. Waiting, instance, may be implemented by polling or sleeping. Sleeping is chosen in the preferred embodiment because it allows other processes to have the greatest possible access to computer resources. While skipping/waiting approach may be appropriate for an image or video process, which can simply skip a frame, it is not the best choice for an audio process. Skipping forward in audio will result in a discontinuity in the audio. The preferred approach for audio is to increase the rate at which the audio plays. If the adjustment is small this temporary increase in the rate may not be noticeable. Similarly, the audio process may need to decrease the rate if the audio process has somehow become ahead of time. If large adjustments are needed in the audio rate, the frequency spectrum of the audio may be adjusted to preserve the tonal properties of the audio, using methods well known in the field of signal processing.

Adding Multimedia

Figure 5:
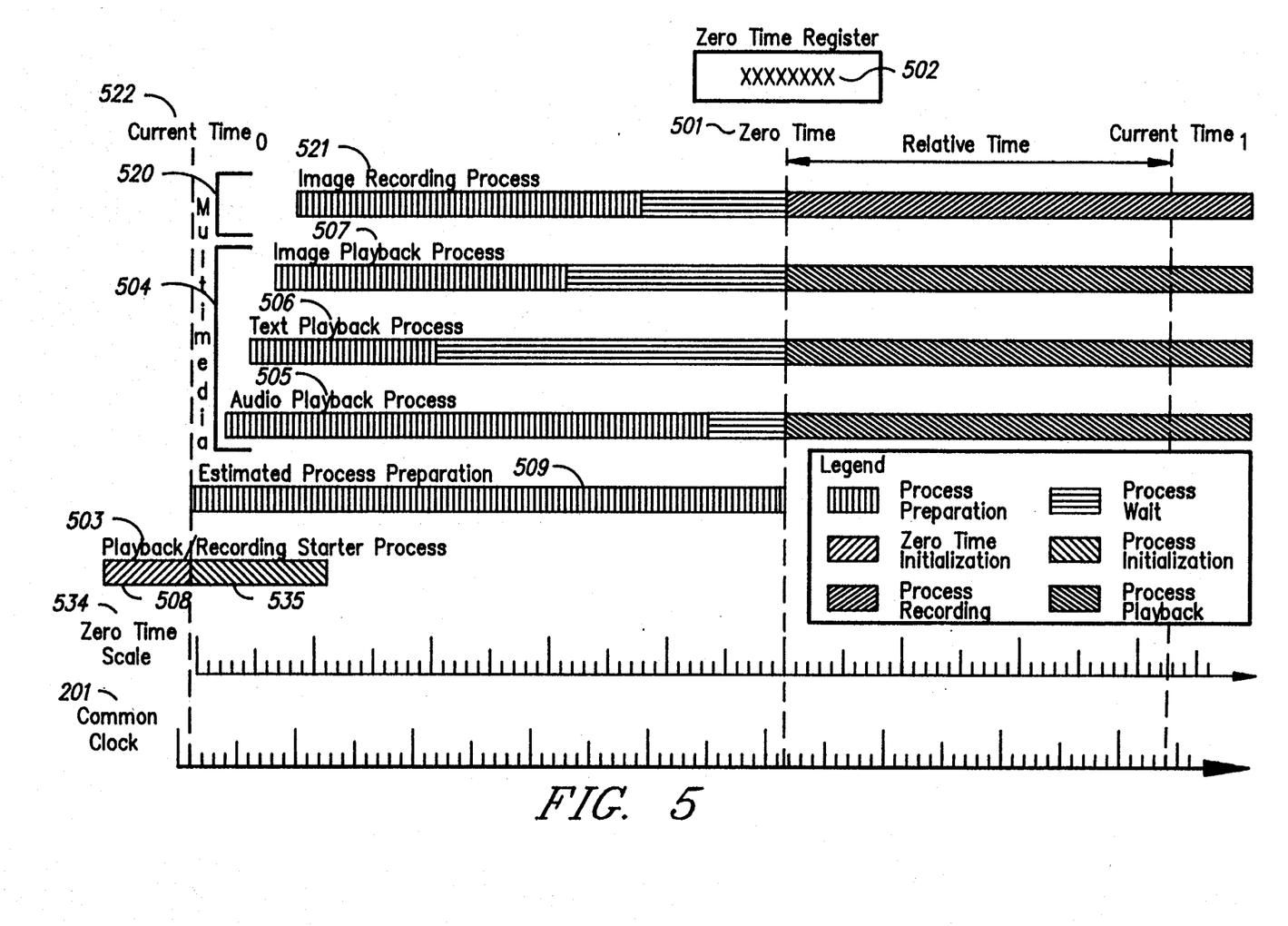
FIG. 5 is a timeline illustrating the synchronized playback and recording of multimedia.

Shown in FIG. 5 is a set of time lines depicting the sequence of adding multimedia to a presentation. Three processes participate in this sequence. The first process establishes zero time at 501 and creates coded zero-time at 502. This process is designated as playback/record starter process 503. From the coded zero-time 302 and the common clock 201 a zero-time scale 534 can be constructed by any process. The second process is in practice one or more processes which use coded zero-time 502 in conjunction with common clock 201 in playing multimedia or single media events. These processes are called media playback processes, designated generally as 504. Examples of media playback processes 504 include audio playback process 505, text playback process 506, and image playback process 507. The third process is also actually one or more processes, which in this instance use coded zero-time 502 in conjunction with common clock 201 in recording multimedia or single media events. These processes are called media recording processes 520. An example of a media recording process is image recording process 521.

As common clock 201 advances, playback/record starter process 503 is started to establish zero-time 501 during zero-time initialization 508 and initiate media playback processes 504 and media recording processes 520 during process initiation 535. Playback/record starter process 503 calculates zero-time 501 based upon the current time 522 on common clock 201 and the estimated process preparation 509 needed by media playback processes 504 and media recording processes 520. Playback/record starter process 503 constructs coded zero-time 502 and initiates audio playback process 505, text playback process 506, image playback process 507, and image recording process 521, passing coded zero-time 502 to each of media playback processes 504 and media recording processes 520. Alternatively, playback/record starter process 503 may keep coded zero-time 502 available for query by any of media playback processes 504 or media recording processes 520. After media playback processes 504 and media recording processes 520 have been initiated, playback/record starter process 503 can either cease, become a member of media playback processes 504, become a member of media recording processes 520, or perform other tasks.

During this time, media playback processes 504 and media recording processes 520 continue to function as described above. The result of the simultaneous playback and recording of multimedia is that the newly recorded media will be in synchronization with the previously recorded media. Each of the recorded media has time synchronization information which can be used by a multimedia player having the ability to recognize common clock 201 and coded zero-time 502.

Creating Coded Zero-time

Figure 6:
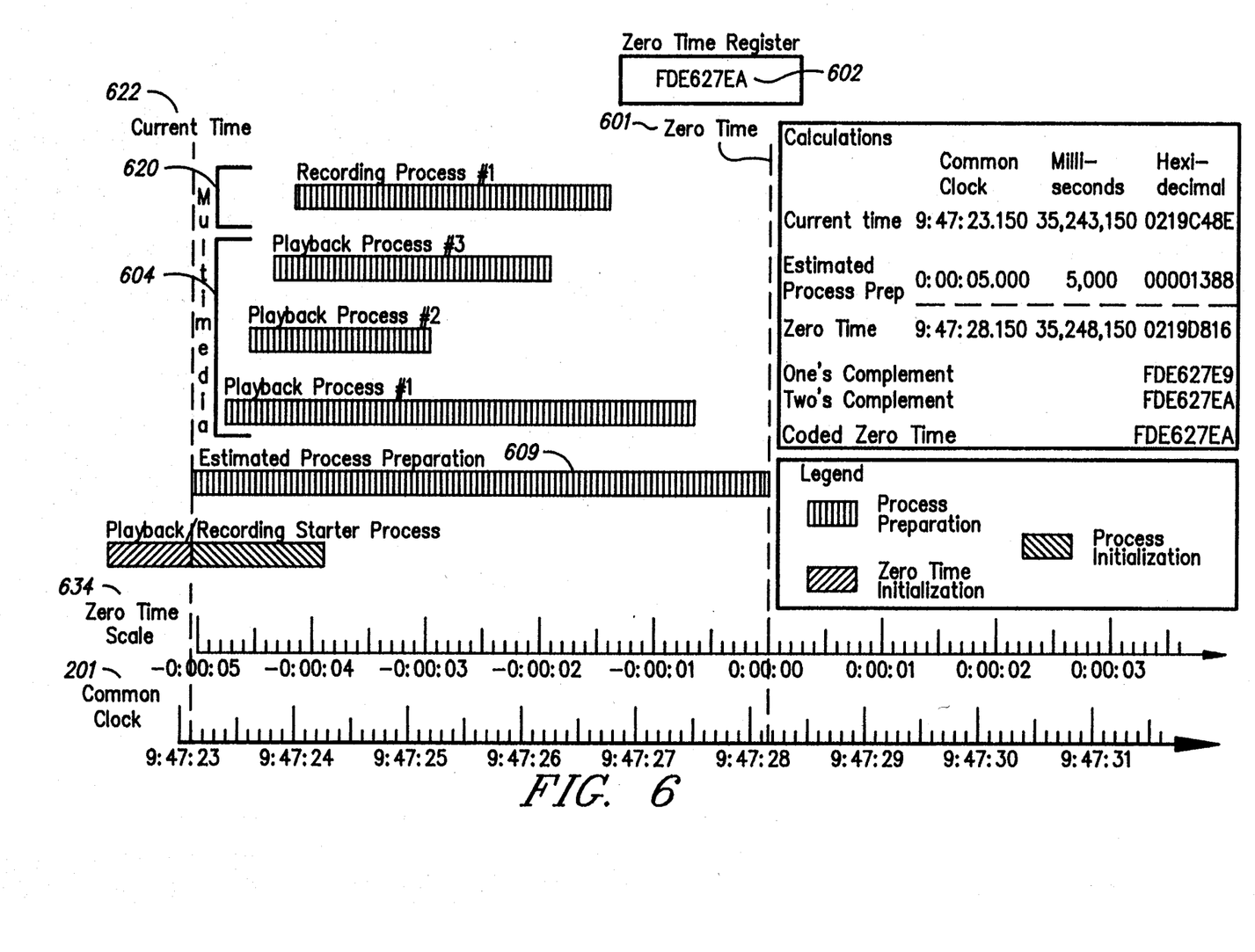
FIG. 6 is a timeline illustrating the determination of zero-time and creation of coded zero-time.

Shown in FIG. 6 is a set of timelines depicting the creation of coded zero-time. The process involves two principal components. The first is the current time on common clock 201. This is denoted as current time 622. The second is information indicative of the anticipated startup times of media recording processes 620 and/or media playback processes 604. This information is used to construct estimated process preparation time 609.

The calculation of zero-time is most easily understood in the context of a specific example. For this purpose, reference will be made to the numerical quantities in FIG. 6. It is to be noted that these quantities and the resulting calculations are presented for illustrative purposes only. As contemplated by the present invention, any clock base and timing may be selected. With reference to FIG. 6, calculation of zero-time 601 begins with selection of a common clock. The exemplary chick selected is 32-bits in length and has increment representing one millisecond. Current time 622 on common clock 201 is 9:47:23.150, the equivalent of 35,243,150 milliseconds. Estimated process preparation time 609 is 5 seconds, which is 5000 milliseconds. Zero-time 601 is calculated as current time 622 added to estimated process preparation time 609. The result is 35,248,150 milliseconds, or 0219D816 in hexadecimal notation.

Using a clock value of zero-time as the basis for a multimedia presentation has an inherent problem, clock wrap. If the highest value of the clock is 999:99:99.999 and zero-time is 999:98:00.000, the multimedia presentation must detect the wrapping of the clock and handle the exception in the next minute. By coding zero-time, the full range of the clock can be used without having to special case for pre-mature clock wrap.

To create coded zero-time 602, also known as coding the zero-time value, the two's complement of zero-time 601 is calculated. Zero-time 601 is 0219D816 (hex). The one's complement of zero-time 601 is FDE627E9 (hex). This quantity can be generated by XORing zero-time 601 with FFFFFFFF (hex). Next, the two's complement of zero-time 601 is FDE627EA (hex). This is determined by adding 1 to the one's complement. Thus, coded zero-time 602 for this example is FDE627EA (hex). From the coded zero-time 602 and the common clock 201 a zero-time scale 634 can be constructed by any process.

Using coded Zero-time

Figure 7:
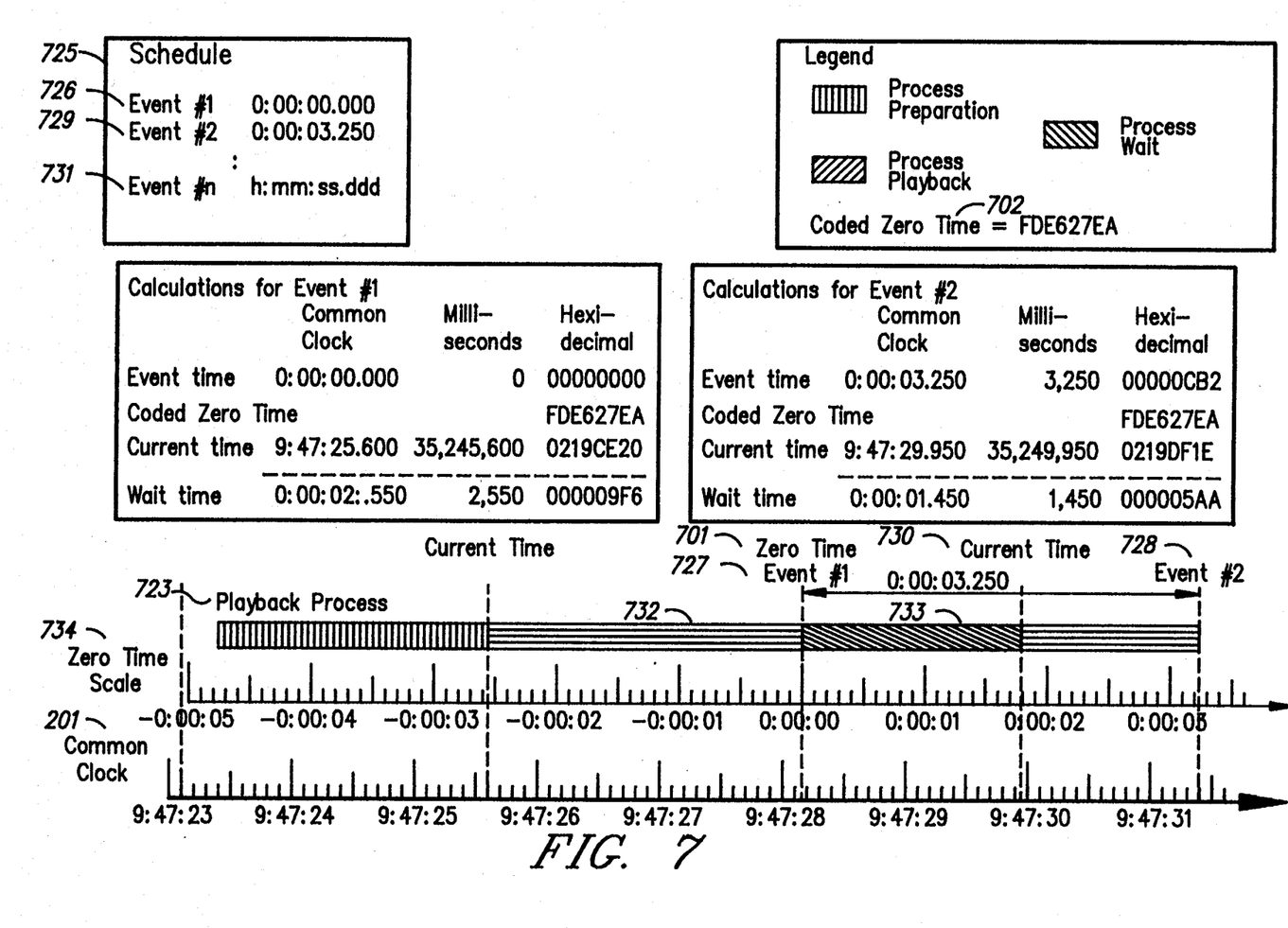
FIG. 7 is a timeline illustrating the use of coded zero-time.

Shown in FIG. 7 is a timeline depicting the use of coded zero-time. The process involves four principal components. The first is coded zero-time 702, which is given to or obtained by process 723. From the coded zero-time 702 and the common clock 201 a zero-time scale 734 can be constructed by any process. The second is the current time on common clock 201. This is denoted as current time 724. The third is a schedule of when each media event occurs, this is a list of event offsets and is designated as event schedule 725. This component could be a rate at which to perform media events rather than a list of discrete media events. The fourth component is a stream of data and a given rate at which to play the data.

The general equation when using zero-time is:

$E-(T-Z)=C$ where E is the offset of the actual event within the presentation 726 729, T is the current time 724 730 on the clock 201, Z is the zero-time 701 for the presentation, and C is the correction 732 733 needed by the media process 723 in the presentation of the media event to reproduce the timing of the actual event. In the case of playback, E, T, and Z are given and C is calculated. C, the correction, will result in the process waiting to perform the next event, performing the event, or advancing within the presentation to "catch up". In the case of record, T, Z, and C are given and E is calculated. C, the correction, is 0 since the time of the actual event is the same as the time of the recorded media event. Since C=0, the general equation becomes:

$E-(T-Z)=0$ which is algebraically equal to:

$E=T-Z$

In the example which follows, zero-time, Z, is not used in the equation. Instead coded zero-time, z, is used. Since z=−Z, because coded zero-time is two's complement of zero-time used to negate the clock wrap problem, the general equation becomes:

$E-(T+z)=C$

As with the calculation of zero-time, use of zero-time is most easily understood in the context of a specific example. For this purpose, reference will be made to the numerical quantities in FIG. 7, while noting that these quantities and the resulting calculations are presented for illustrative purposes only. As shown, process 723 obtains coded zero-time 702 and stores it for frequent access. In particular, zero-time information 702 is FDE627EA (hex), and the time of event #1 726 on event schedule 725 is 0:00:00.000. Based on this information, precisely at zero-time 701 process 723 determines when to play the event. Current time 724 is 9:47:25.600, which is 35,245,600 milliseconds or 0219CE20 (hex). To determine how long the process 723 should wait for event #1 727, the sum of coded zero-time 702 and current time 724 is subtracted from the time of event #1 726, yielding a result of 000009F6 (hex), which is 2550 milliseconds. (That is: 00000000 (hex)−(FDE627EA (hex)+0219CE20 (hex))=000009F6 (hex).) The result is that process 723 must wait 2550 milliseconds before executing the event, i.e. playing event #1 727.

After event #1 727 has been performed by process 723, process 723 immediately begins preparing for event #2 728. A media process, such as process 723, should accomplish as much preparatory work as possible before determining the next-event time, the time of event #n+1. By doing this, a media process will have the shortest code path length between the time the process is done waiting and the time the media event is to occur. This decreases the opportunity for variability in when the media event actually occurs. After process 723 has completed as much preparatory work as possible without actually performing event #2 728, it determines when to play event #2 728. Based on a time of event #2 729 of 0:00:03.250 on event schedule 725, it is noted that event #2 is to begin at 3250 milliseconds into the multimedia presentation, or 00000CB2 (hex). Current time 730 is now 9:47:29.950, which is 35,249,950 milliseconds or 0219DF1E (hex). To determine how long the process 723 should wait for event #2 728, the sum of coded zero-time 702 and current time 730 is subtracted from the time of event #2 729, yielding a result of 000005AA (hex), which is 1450 milliseconds. (That is: 00000CB2 (hex)−(FDE627EA (hex)+0219DF1E (hex))=000005AA (hex).) Thus, process 723 must wait 1450 milliseconds before playing event #2 728.

The above procedure is used to determine the timing for each media event. Where the result of the equation is positive, process 723 must wait the number of milliseconds given by the result. Where the result of the equation equals zero, process 723 plays the event immediately. Where the result of the equation is negative, process 723 must "catch up" by the absolute value of the result in milliseconds. Each of media playback processes may determine its method for regaining synchronization, as described above.

In certain circumstances, a time lag may occur between the starting of a media event and the actual presentation of the event to the observer. This may be caused by latent processing, hardware speed, or other dependencies. If the lag time is predictable, a correction for the lag time, called the correction time, can be appended to the calculations described above. In particular, the sum coded zero-time 702 and current time is subtracted from the time of event #n 731; then the predicted amount of lag time is subtracted from this quantity.

For streams of data, zero-time 701 is periodically checked, by the process responsible for that media, against the current position in the stream to determine if the stream should be consumed at the same rate, accelerated, or decelerated. In this way, slight discrepancies between the playing speed of various media can be corrected dynamically.

Media Repositioning

Figure 8:
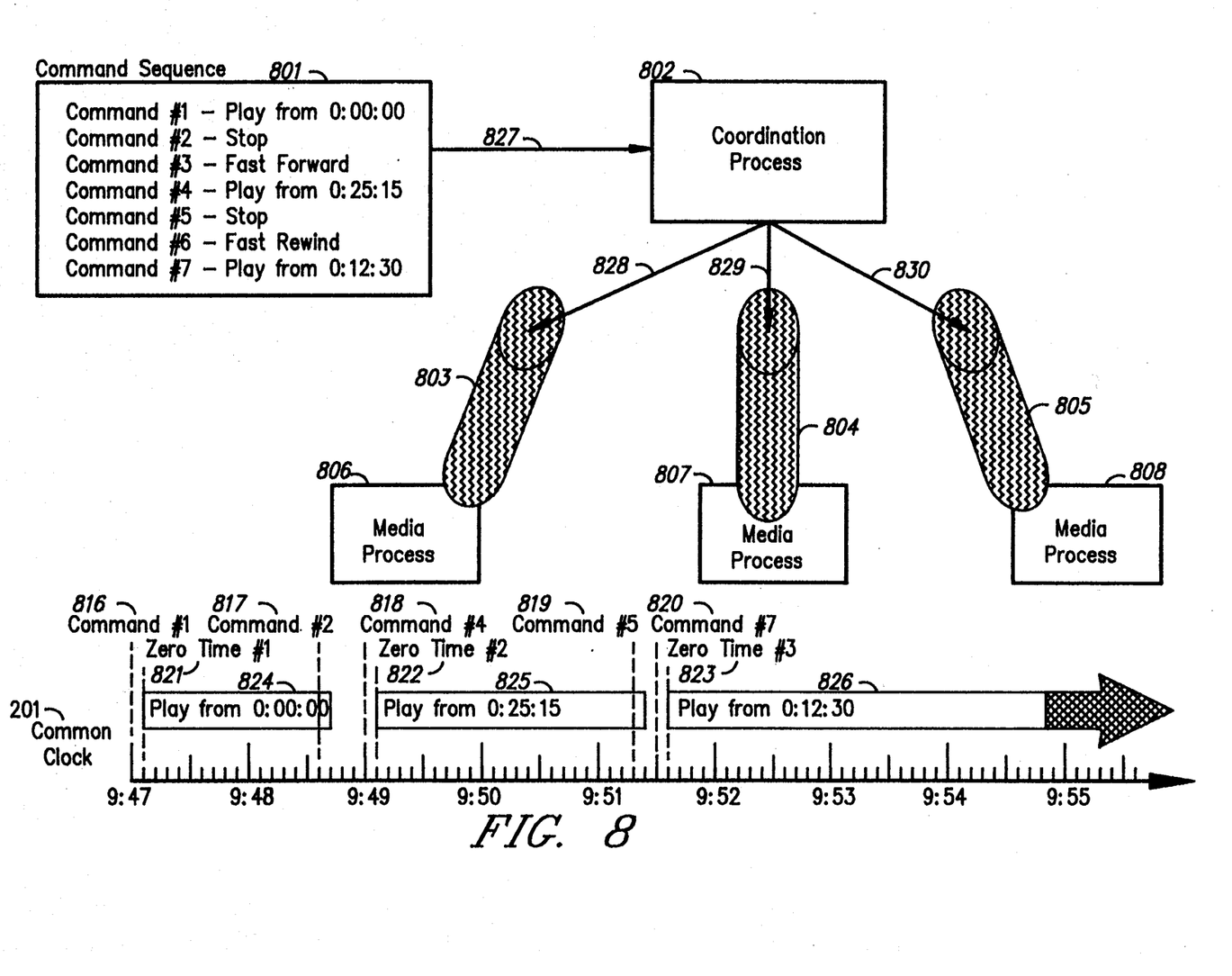
FIG. 8 is a timeline illustrating the use of zero-time in media repositioning operations.

FIG. 8 shows a representation or the use or the present invention in synchronizing multimedia during media repositioning commands. Media repositioning commands may include fast forward, fast rewind, stop, instant replay, rewind, etc.

The example given in FIG. 8 represents how a user might interact with a system which uses zero-time based synchronization and how the system would respond. In this example, the user initially wants to see the multimedia presentation from the beginning. After watching and listening for a minute or two, the user would like to see what's ahead in the multimedia presentation. The user fast forwards twenty-five minutes into the presentation and plays from that point for a little over two minutes. Realizing that there is some important information earlier in the multimedia presentation, the user rewinds back to the twelve minute mark and plays to the end of the presentation.

The components of FIG. 8 are: A command sequence 801 which the user passes into the system 827. The time at which the commands are given are at the discretion of the user. A coordination process 802 which receives the command sequence 801 and issues coordination messages 828 829 830 through interprocess communication 803 804 805 to each of the media processes 806 807 808. A timeline demarcated by the passing of time in the common clock 201 will be used to demonstrate the activity within the system.

At time 9:47:00.00 on the common clock 201, the user issues command #1 816 "Play" which is translated into "Play from 0:00:00" 809. This command is passed to the coordination process 802 which performs the actions of the starter process described in the "PLAYING MULTIMEDIA" section. It determines zero-time #1 821, creates coded zero-time as described in the "CREATING CODED ZERO-TIME" section, initiates media processes 806 807 808, and transmits 828 829 830 coded zero-time and the offset into the presentation at which to begin, 0:00:00.000 through interprocess communication 803 804 805. The media processes 806 807 808 perform the actions of the playback processes described in the "PLAYING MULTIMEDIA" section. They perform process preparation, potentially perform process wait, and perform media events as described in the "USING CODED ZERO-TIME" section.

The user decides after watching/listening to one minute and thirty seconds 824 of the presentation that it's time to advance into the presentation. First, the user issues command #2 817 "Stop" 810 which is sent to the coordination process 802 and transmitted 828 829 830 through interprocess communication 803 804 805 to each of the media processes 806 807 808. Each media process 806 807 808 stops presenting its media. Second, the user issues command #3—"Fast Forward" 811. This command is not sent to the media processes 806 807 808; it is handled completely within the coordination process 802. The coordination process 802 gives the user a feedback as to how far "Fast Forward" has advanced into the multimedia presentation. These two commands 810 811 could be combined into one at the user interface level, but would be kept as two commands at the operational level.

When the user is notified that the multimedia presentation has been advanced to 0:25:15, the user issues command #4 818 "Play" which is translated into "Play from 0:25:15" 812. This command is passed to the coordination process 802 which performs the actions of the starter process described in the "PLAYING MULTIMEDIA" section. It determines zero-time #2 822, creates coded zero-time as described in the "CREATING CODED ZERO-TIME" section, and transmits 828 829 830 coded zero-time and the offset into the presentation at which to begin, 0:25:15.000, through interprocess communication 803 804 805. The media processes 806 807 808 perform the actions of the playback processes described in the "PLAYING MULTIMEDIA" section. They perform process preparation, potentially perform process wait, and perform media events as described in the "USING CODED ZERO-TIME" section.

The user decides after watching/listening to about two and one-quarter minutes 825 of the presentation that it's time to return to an earlier spot in the presentation. First, the user issues command #5 819 "Stop" 813 which is sent to the coordination process 802 and transmitted 828 829 830 through interprocess communication 803 804 805 to each of the media processes 806 807 808. Each media process 806 807 808 stops presenting its media. Second, the user issues command #6—"Fast Rewind" 814. This command is not sent to the media processes 806 807 808; it is handled completely within the coordination process 802. The coordination process 802 gives the user a feedback as to how far "Fast Rewind" has backed up in the multimedia presentation. These two commands 813 814 could be combined into one at the user interface level, but would be kept as two commands at the operational level.

When the user is notified that the multimedia presentation has backed up to 0:12:30, the user issues command #7 820 "Play" which is translated into "Play from 0:12:30" 815. This command is passed to the coordination process 802 which performs the actions of the starter process described in the "PLAYING MULTIMEDIA" section. It determines zero-time #3 823, creates coded zero-time as described in the "CREATING CODED ZERO-TIME" section, and transmits 828 829 830 coded zero-time and the offset into the presentation at which to begin, 0:12:30.000, through interprocess communication 803 804 805. The media processes 806 807 808 perform the actions of the playback processes described in the "PLAYING MULTIMEDIA" section. They perform process preparation, potentially perform process wait, and perform media events as described in the "USING CODED ZERO-TIME" section. Since the user does not issue another command, each media process 806 807 808 continues performing 826 until it has no more events to perform, at which time it behaves as if it were sent a "Stop" command.

Conclusion

While the invention has been described and illustrated in terms of synchronization of multimedia, it is to be noted that the principles and concepts presented may be readily adapted for use in synchronizing any computer-based process or processes, both in terms of initiation anti ongoing execution. Thus, for example, in a multi-programming computer system, performance measuring processes or vectorized processes requiring simultaneous data availability may be synchronized using a single common clock and a starter process to determine and broadcast a zero-time value in the same fashion as described above.

Additionally, while the foregoing description has included detailed discussion of the mathematics used to determine zero-time, coded zero-time, and numerous offset/adjustment values, it is to be noted that many alternative schemes could be devised for combining values, separating values, scaling values, or shifting values. Thus, for instance, zero-time could be replaced by 1000-time, which additionally could be combined with the media-start time and used in combined form to drive synchronization for a particular media process. Such modifications are considered to be of form rather than substance, and hence within the spirit and scope or the present invention.

Using the foregoing specification, the invention may be implemented by standard programming and/or engineering techniques. The resulting program(s) may be stored on disk, diskettes, memory cards, ROM or any other memory device. For execution, the program(s) may be copied into a system memory (RAM) associated with a computer processor. One skilled in the art of computer science will readily be able to combine the system and process created as described above with appropriate general purpose or special purpose computer hardware to create a computer system embodying the invention, While the invention has been particularly described and illustrated with reference to a preferred embodiment, it will be understood by those skilled in the art that changes in the description and illustrations may be made with respect to form or detail without departing from the spirit and scope of the invention.

What is claimed is:

1. A method for synchronizing initiation of media operations in a multimedia recording and playback system, comprising the steps of:

in a starter process, receiving the current time from a clock means, assigning the received current time as an initialization-time value, determining a zero-time value by adding a process preparation time to the initialization-time value, broadcasting the zero-time value to at least one media process; and in the media process, receiving the zero-time value, upon the current time reaching the zero-time value, initiating the media operations, thereby, synchronizing initiation of the media operations.

2. A method for synchronizing initiation as recited in claim 1, wherein the media operation is any of image recording, image playback, text recording, text playback, audio recording, and audio playback.

3. A method for synchronizing initiation as recited in claim 1, wherein the clock means is a system real-time clock.

4. A method for synchronizing initiation as recited in claim 1, wherein the media process initiates its media operation independently of other media processes.

5. A method for synchronizing initiation as recited in claim 4, wherein media process receives exactly one zero-time value transmission, and wherein the zero-time value transmission constitutes the only synchronization transmission initiated from the starter process to the media process.

6. A method for synchronizing initiation of media operations in a multimedia recording and playback system, comprising the steps of:
in a starter process, receiving the current time from a clock means, assigning the received current time as an initialization-time value, determining a zero-time value by adding a process preparation time to the initialization-time value, broadcasting the zero-time value to at least one media process; and
in the media process, receiving the zero-time value, determining a media start-time by combining an offset time with the zero-time value, and upon the current time reaching the media start-time, initiating the media operation,
thereby, synchronizing initiation of the media operations.

7. A method for synchronizing initiation as recited in claim 6, wherein the media start-time is determined by adding the offset time to the zero-time value.

8. A method for synchronizing media recording in a multimedia recording and playback system, comprising the steps of:
in a starter process, receiving the current time from a clock means, assigning the received current time as an initialization-time value, determining a zero-time value by adding a process preparation time to the initialization-time value; broadcasting the zero-time value to at least one media process; and
in the media process, receiving the zero-time value, upon the current time reaching the zero-time value, repeating for each media event the sub-steps of obtaining the current time from the clock means, determining an event offset based on the zero-time value and the current time, logging the event offset in association with the media event, recording the media event,
thereby, synchronizing the media recording.

9. A method for synchronizing media recording as recited in claim 8, wherein the step of repenting for each media event further comprises the sub-step of, after recording the media event, waiting for arrival of the next media event.

10. A method for synchronizing media recording as recited in claim 8, wherein a media event includes any of a single presentation object and a set of presentation objects.

11. A method for synchronizing media recording as recited in claim 8, wherein the logging step logs the event offset into the data rate of the recorded data.

12. A method for synchronizing media recording as recited in claim wherein the event offset is determined by subtracting the zero-time value from the current time.

13. A method for synchronizing media recording as recited in claim 8, wherein the step of determining n zero-time value further includes coding the zero-time value by computing its two's complement.

14. A method for synchronizing media recording as recited in claim 8, wherein the media process determines the granularity and number of media events independently of the starter process and other media processes.

15. A method for synchronizing media recording as recited in claim 8, wherein the clock means is a system real-time clock.

16. A method for synchronizing media recording as recited in claim 8, wherein the media process operates independently of other media processes and the starter process.

17. A method for synchronizing media recording as recited in claim 16, wherein the media process receives exactly one zero-time value transmission, and wherein the zero-time value transmission constitutes the only synchronization transmission initiated from the starter process to the media process.

18. A method for synchronizing media recording in a multimedia recording and playback system, comprising the steps of:
in a starter process, receiving the current time from a clock means, assigning the received current time as an initialization-time value, determining a zero-time value by adding a process reparation time to the initialization-time value, broadcasting the zero-time value to at least one media process; and
in the media process, receiving the zero-time value, determining a media start-time by adding an offset time to the zero-time value, upon the current time reaching the media start-time, repeating for each media event the sub-steps of obtaining the current time from the clock means, determining an event offset based on the zero-time value and the current time, logging the event offset in association with the media event, recording the media event,
thereby, synchronizing the media recording.

19. A method for synchronizing media playback in a multimedia recording and playback system, comprising the steps of:
in a starter process, receiving the current time from a clock means, assigning the received current time as an initialization-time value, determining a zero-time value by adding a process preparation time to the initialization-time value; broadcasting the zero-time value to at least one media process; and
in the media process, receiving the zero-time value, accessing a log of event offset times associated with a plurality of media events, for each logged event offset time, performing the sub-steps of readying the associated media event for playing, and when the event offset time arrives, playing the media event,
thereby, synchronizing the media playback.

20. A method for synchronizing media playing as recited in claim 19, wherein the event offset time arrival is determined by comparing the current time with the sum of the zero-time value and the logged event offset time.

21. A method for synchronizing media playing as recited in claim 19, wherein the log of event offset times is provided in the data rate of the recorded data.

22. A method for synchronizing media playing as recited in claim 19, wherein the log of event offset times is created by any of recording and authorship.

23. A method for synchronizing media playing as recited in claim 19, wherein the step of performing sub-steps further comprises the sub-steps of
determining a correction time based on the event offset time, the current time, and zero-time,
for a non-zero correction time, performing a resynchronization action on the next media event.

24. A method for synchronizing media playing as recited in claim 19, wherein the correction time is determined by subtracting the current time from the sum of zero-time and the event offset time.

25. A method for synchronizing media playing as recited in claim 19, wherein for a negative correction time the resynchronization action includes any of compression, truncation, and deletion.

26. A method for synchronizing media playing as recited in claim 19, wherein for a positive correction time the resynchronization action includes any of waiting and elongation.

27. A method for synchronizing media playing as recited in claim 19, wherein the step of determining a zero-time value further includes coding the zero-time value by computing its two's complement.

28. A method for synchronizing media playing as recited in claim 19, wherein the clock means is a system real-time clock.

29. A method for synchronizing media playing as recited in claim 19, wherein the media process operates independently of other media processes and the starter process.

30. A method for synchronizing media playing as recited in claim 29, wherein the media process receives exactly one zero-time value transmission, and wherein the zero-time value transmission constitutes the only synchronization transmission initiated from the starter process to the media process.

31. A method for synchronizing media recording as recited in claim 19, wherein the media process terminates itself upon playing its final media event.

32. A method for synchronizing media playback in a multimedia recording and playback system, comprising the steps of:
   in a starter process, receiving the current time from a clock means, assigning the received current time as an initialization-time value, determining a zero-time value by adding a process preparation time to the initialization-time value; broadcasting the zero-time value to at least one media process; and
   in the media process, receiving the zero-time value, accessing a log of event offset times associated with a plurality of media events, for each logged event offset time, performing the sub-steps of readying the associated media event for playing, and when the event offset time arrives, playing the media event,
   thereby, synchronizing the media playback.

33. A method for synchronizing initiation of events in a multiprogramming computer system, comprising the steps of:
   in a starter process, receiving the current time from a clock means, assigning the received current time as an initialization-time value, determining a zero-time value by adding a process preparation time to the initialization-time value, broadcasting the zero-time value to at least one receiving process; and
   in the receiving process, receiving the zero-time value, upon the current time reaching the zero-time value, initiating the event,
   thereby, synchronizing initiation of the media events.

34. A method for synchronizing events in a multiprogramming computer system, comprising the steps of:
   in a starter process, receiving the current time from a clock means, assigning the received current time as an initialization-time value, determining a zero-time value by adding a process preparation time to the initialization-time value; broadcasting the zero-time value to at least one receiving process; and
   in the receiving process, receiving the zero-time value, upon the current time reaching the zero-time value, repeating for each event the sub-steps of executing the event, determining a next-event time, waiting until the current time reaches the next-event time,
   thereby, synchronizing the events.

* * * * *